United States Patent [19]
Kraus

[11] 3,810,398
[45] May 14, 1974

[54] TORIC TRANSMISSION WITH HYDRAULIC CONTROLS AND ROLLER DAMPING MEANS

[75] Inventor: Charles E. Kraus, Austin, Tex.
[73] Assignee: Tracor, Inc., Austin, Tex.
[22] Filed: Nov. 16, 1972
[21] Appl. No.: 306,909

[52] U.S. Cl. .............................................. 74/200
[51] Int. Cl. ...................... F16h 15/10, F16h 15/12
[58] Field of Search ............................................ 74/200

[56] References Cited
UNITED STATES PATENTS
| | | | |
|---|---|---|---|
| 3,142,190 | 7/1964 | Kelsey et al. | 74/200 |
| 3,142,189 | 7/1964 | Davis et al. | 74/200 |
| 3,087,348 | 4/1963 | Kraus | 74/200 |

Primary Examiner—Samuel Scott
Assistant Examiner—Allan Russell Burke
Attorney, Agent, or Firm—T. L. Bowes

[57] ABSTRACT

A rotary motion transmitting device having oppositely disposed toric discs mounted on its input and output shafts. Motion transmitting rollers are frictionally engaged between the toric discs for transmitting motion from one toric element to the other and supported by tension sheets extending between opposite rollers to balance forces exerted on the rollers. Independent hydraulic precess cams control the position of each roller.

13 Claims, 5 Drawing Figures

TORIC TRANSMISSION WITH HYDRAULIC CONTROLS AND ROLLER DAMPING MEANS

BACKGROUND OF THE INVENTION

The invention relates to motion transmitting devices in which motion is transmitted from a toric disc mounted on an input shaft to a toric disc mounted on an output shaft by traction rollers disposed between and in engagement with the toric discs.

To enable such toroidal motion transmitting devices to transmit large torques at high speeds for long life the traction rollers are positioned inwardly of the center of the toroidal cavity between the toric discs. Such an arrangement causes relatively little spin in the contact area of the traction rollers with the toric discs so that a relatively high traction coefficient and relatively little wear on the surfaces of the toric discs and the traction rollers are obtained. The contact forces necessary for engagement of the traction rollers with the toric discs are obtained by forcing the toric discs toward each other. This, however, results in a large axial thrust load of the traction rollers which is carried on to axial thrust bearings supported by the housing of the rotary motion transmitting device as shown for example in U.S. Pat. No. 3,299,744. In such arrangements, the housings do not only have to take up the bearing forces, but a large amount of vibrations is also carried from the traction rollers into the housings. Furthermore, the transmission ratio control arrangements for such devices include mechanical actuating means, which also carry noises and vibrations to the housing. The positioning controls for the rollers are usually interconnected thereby causing backlash, deflections and undampened movements that interfere with balanced operation.

SUMMARY OF THE INVENTION

A rotary motion transmitting device is provided in which power transmitting traction rollers are disposed between toric discs carried by input and output shafts. For transmitting a torque, the toric discs are forced toward each other and into frictional engagement with the power rollers which are supported between the toric discs by a power roller support structures. The support structures of the power rollers are interconnected by tension means which extend between the toric discs and balance the forces and vibrations exerted on the power rollers while allowing nearly friction free transverse motion of the roller assemblies for balance of tangential and control forces and for transverse shifting of the roller assembly for transmission ratio changing pivoting of the roller support structure.

DESCRIPTION OF THE PREFERRED EMBODIMENT

Figure 1:
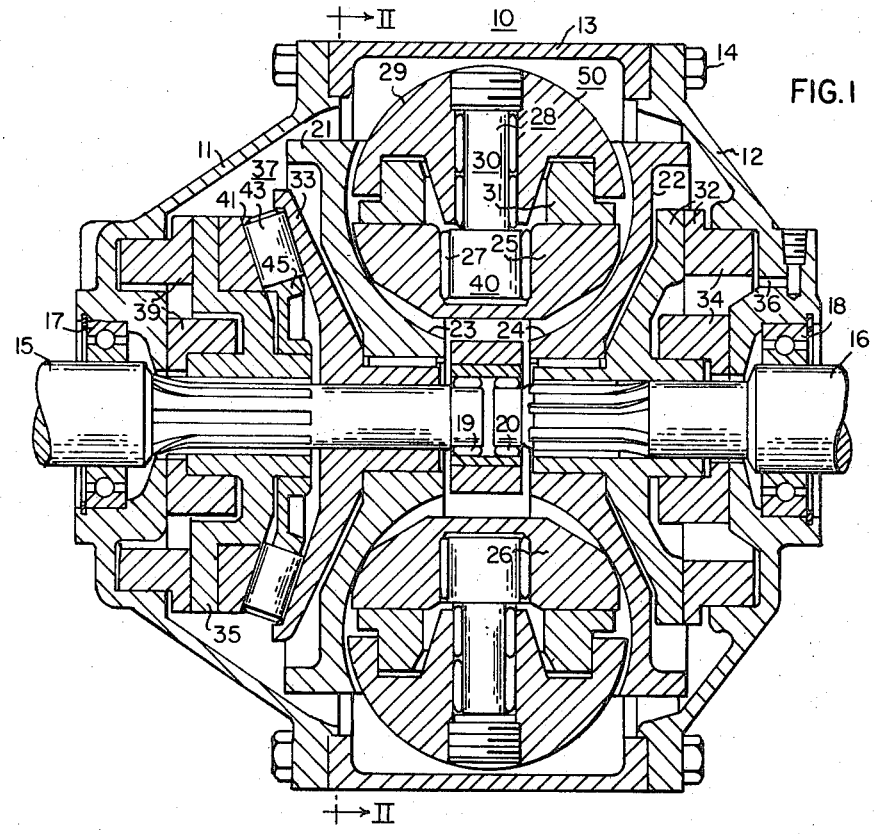
FIG. 1 is a cross-sectional view of the motion transmitting device showing the general arrangement of the elements of the device.

As shown in FIG. 1, the rotary motion transmitting device comprises a housing 10 consisting of a central part 13, a front part 11 disposed at one end of the central part 13 and a rear part 12 disposed at the opposite end of the central part 13. The housing parts 11, 12 and 13 are held together as by tension bolts 14. Coaxial input and output shafts 15 and 16 extend through the front and the rear parts 11 and 12 of the housing 10 and are rotatably supported by input and output shaft bearings 17 and 18 and by central support bearings 19 and 20.

The input shaft 15 carries an input traction disc 21 and the output shaft 16 carries an output traction disc 22 disposed opposite the input traction disc. The traction discs 21 and 22 have opposite toroidal surfaces 23 and 24 and are adapted to engage therebetween power rollers 25 and 26 for the transmission of motion from the input traction disc to the output traction disc. The power rollers 25 and 26 are supported suported by bearings 27 on a shaft 28 journalled in a roller support structure 29. The shaft 28 has eccentric bearing portion 30 and 40 to permit slight movement of the rollers in a direction normal to the shaft when necessary for firm engagement with the input and output traction discs. Axial support is provided for the power rollers 25 and 26 by axial thrust bearings and seal assemblies 31 preferably of the type as described in applicant's earlier U.S. Pat. application Ser. No. 256,143, filed May 5, 1972, or in U.S. Pat. No. 3,486,391.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22.

The input traction disc 21 is mounted on an axial input thrust member 33 which is freely rotatable on the input shaft 15 and together with an axial pressure plate 35 forms a load cam structure 37 for forcing the input traction disc 21 toward the output traction disc 22 and both discs into engagement with the power rollers when a torque is transmitted through the transmission. Adjacent the input thrust member 33, the pressure plate 35 has cam faces 41 with cam rollers 43 disposed between the thrust member 33 and the cam faces 41 to be wedged therebetween when the input shaft is rotated. The rollers 43 are held in position by a cage 45. The pressure plate 35 is mounted on the input shaft 15 for rotation therewith and axially supported by a hydrostatic axial thrust bearing 39 disposed between the pressure plate 35 and the housing part 11. The hydrostatic axial thrust bearings 39 and 34 are preferably of the type described in the present inventor's earlier U.S. Pat. application Ser. No. 256,143 and filed May 5, 1972. Hydraulic fluid is supplied to the bearings through passages 36 as shown in FIG. 1 only for bearing 34.

Figure 2:
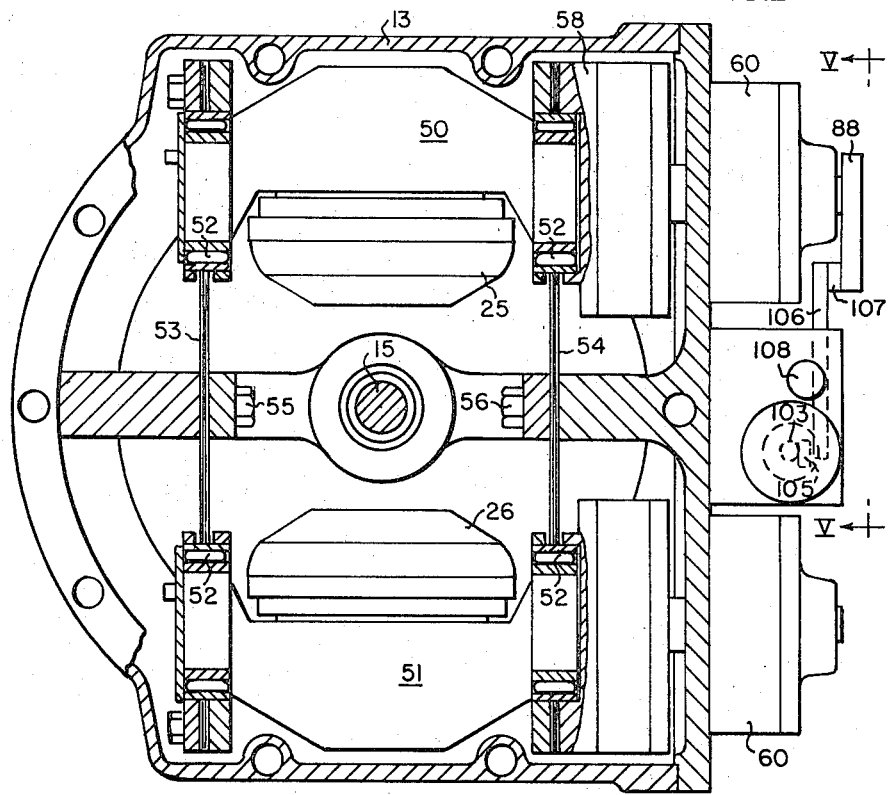
FIG. 2 is a cross-sectional view along lines II—II of FIG. 1 showing the suspension arrangement for the roller support structure.

The roller pivot support structure 29 is more clearly shown in FIG. 2. The rollers 25 and 26 are supported in the housing 10 by pivot shafts 50 and 51 which are disposed in radial symmetry with respect to the input and output shafts, that is, with two rollers, diametrically opposite each other and supported by radial bearings 52 on tension sheets 53 and 54 which take up the bearing load as caused by the contact forces of the rollers 25 and 26. The contact forces of both opposite power rollers 25 and 26 are the same and the resultants directed in opposite direction are balanced by the tension sheets so that the housing 10 is not subjected to such forces and to vibrations as caused by the power rollers.

The tension sheets 53 and 54 preferably consist of laminated steel leaves with sheets of plastic material disposed between the steel leaves. Each of the tension sheets 53 and 54 is anchored at its center to the housing as by bolts 55 and 56, so that slight movement of the power rollers in axial direction of the pivot shafts is possible.

As is known in the art, changing of the transmission ratio is effected by changing the angular position of the pivot shafts and, in accordance therewith, the circles of engagement of the input and output traction discs with the power rollers. In the present arrangement, however, such change is effected by cooperation of a rotary piston disposed in a housing 58 connected to and movable with the tension sheet 54 and a piston connected to the pivot shaft and disposed in a cylinder 60 associated with the transmission housing. The arrangement is for both pivot shafts the same and is, therefore, described only for one shaft with reference to FIGS. 3 and 4.

Figure 4:
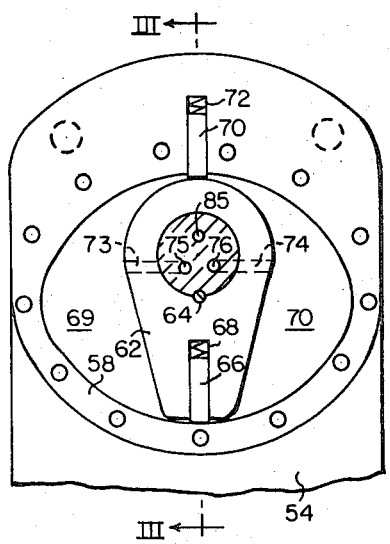
FIG. 4 is a view along line IV—IV of FIG. 3.

The rotary piston housing 58 which is attached to the tension sheet 54 carries also the bearings 52 for pivotally supporting the pivot shaft 50. The rotary piston 62 is mounted on the pivot shaft for rotation therewith by a key 64. As shown in FIG. 4, the rotary piston 62 has a spring loaded sealing strip 66 disposed in a radial slot 68, and in engagement with the wall of the rotary piston housing 58 to prevent leakage between the two pressurized fluid chambers 69, 70 at opposite sides of the piston. A similar sealing strip 71 is disposed in a slot 72 in the housing 58 and forced in engagement with the rotary piston surface. Pressurized fluid may be admitted to the chambers 69 and 70 through radial passages 73 and 74 and axial passages 75 and 76 in the pivot shaft 50.

The pivot shaft 50 extends through the housing 10 and carries a piston 78 disposed in a cylinder 80 associated with the housing 10. The piston 78 is firmly mounted on the shaft 50 so that axial movement of the piston 78 causes axial movement of the shaft 50. Pressurized fluid may be admitted to the cylinder 60 at either side of the axial piston through admission openings 81, 82 resulting in slight axial movement of the pivot shaft for changing the transmission ratio.

Figure 3:
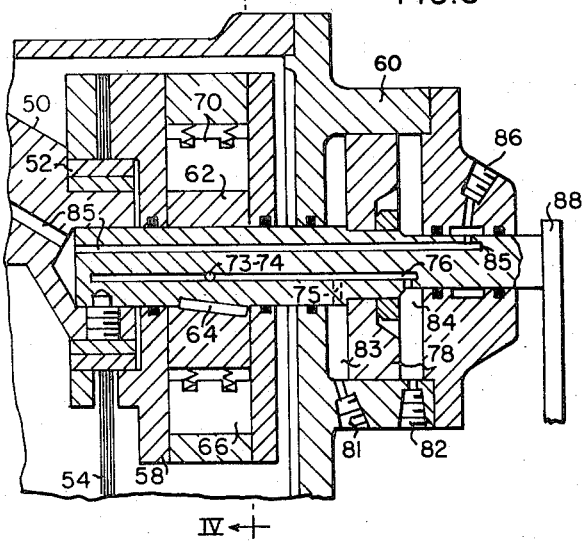
FIG. 3 is a cross-sectional view of the pivoting arrangement for the pivot shafts supporting the power rollers.

As shown in FIGS. 3 and 4, the cylinder chamber 83 at one side of the piston 78 is in communication with the chamber 69 of the rotary piston 62, and the cylinder chamber 85 at the other side of the piston 78 is in communication with the chamber 70 of the rotary piston 62. Consequently, admission of pressurized fluid for example to the piston chamber 84 forces the pivot shaft 50 slightly inwardly, and the concurrent pressurization of chamber 69 applies a pivoting torque to the pivot shaft, both the axial movement of the shaft and the pivoting torque cooperating to change the transmission ratio.

Axial motion of the roller pivot shaft is essentially friction free, axial movement of the pivot shaft causing a precess action steering the rollers to different circles of engagement with the traction discs.

There is also a pressurized fluid supply passage 85 extending through the shaft 50 to supply pressurized fluid to the axial thrust bearing of the power roller 25 supported by the pivot shaft 50. The passage 85 is in communication through inlet opening 86 with a pressurized fluid supply common to all pressurized fluid users.

Figure 5:
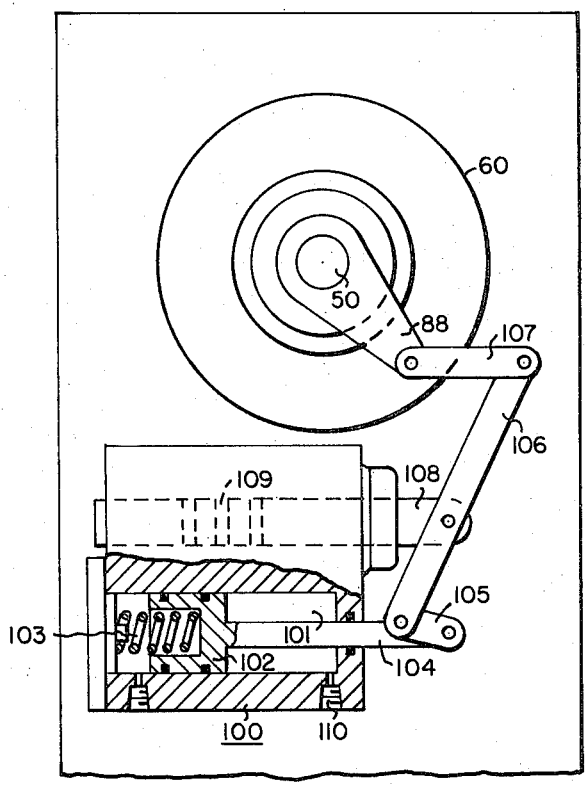
FIG. 5 is a view of the device along line V—V of FIG. 2 showing diagrammatically the pivoting control arrangements for the pivot shafts.

Admission of pressurized fluid to either chamber 83, 84 at opposite sides of the axial piston 78 is controlled by a four-way servo valve 100 (FIG. 5) operatively connected to the pivot shaft 50 by a lever and link arrangement including a pivot arm 88 mounted on the pivot shaft 50 for rotation therewith. Pressurized fluid lines (not shown) extend between the admission openings 81 and 82 of the cylinder 60 and the four-way servo valve 100. The four-way servo valve is shown in FIG. 5 only diagrammatically as it is of common design of the type described for example in the textbook "Fluid Power Control" 1960, published by The Technology Press of MIT and John Wiley and Sons, Inc. New York and London. It is responsive to the control fluid pressure in a control cylinder 101 having disposed therein a piston 102 loaded by a spring 103. The piston rod 104 extends through the cylinder and is linked by a link 105 to one end of a valve lever 106 linked at its other end to the pivot arm 88 of the pivot shaft 50 by a link 107. At an intermediate location, the valve lever 106 has connected thereto the operating stem 108 of a servo valve 109 for controlling pressurization of the piston chambers 83 and 84 depending on the position of the pivot arm 88 and the position of the piston 102. The position of the piston 102 depends on the pressure of a control fluid admitted to the cylinder 101 through the fluid inlet opening 110, such control pressure signal being derived, for example, from a speed controller. For torque or load responsive control, the control signal could be proportional to the tangential forces on the rollers since these forces are balanced by the differential pressure on opposite sides of the piston 78.

OPERATION OF THE ROTARY MOTION TRANSMITTING DEVICE

Rotation of the input shaft 15 and transmission of a torque through the device causes the loading cam structure 37 to force the input traction disc 21 toward the output traction disc 22 thereby frictionally engaging the power rollers 25 and 26 with both traction discs. Rotation of the input traction disc 21 in one direction causes rotation of the output traction disc 22 and the output shaft 16 in the opposite direction at a speed which depends on the angular position of the pivot shafts 50 and 51. Such engagement produces on each roller 25 and 26 large oppositely directed forces which are taken up by the pivot shafts and balanced through the tension sheets 53 and 54 without reaching the housing.

During operation when the power rollers are in firm engagement with the traction discs, pivoting of the pivot shaft is obtained by slight axial movement of the pivot shaft. Such axial movement moves the power rollers away from their neutral positions and causes them to walk to larger circles of engagement with one of the traction discs and to smaller circles of engagement with the other traction disc. This changes the angular position of the pivot shaft levers 88 thereby adjusting the servo valve 109 to cause axial return of the pivot shaft to its neutral position in which the power rollers remain in engagement with the traction rollers at the momentaneous circles of engagement i.e. at the momentaneous transmission ratio.

As pointed out earlier, the tension sheets 53 and 54 balance the radial forces exerted on the pivot shafts by the power rollers. They also take up and dampen the vibrations of the power rollers, which forces and vibrations are not passed on to the housing. Furthermore, the tension sheets permit frictionless axial movement of the pivot shafts 50 and 51 for changing the transmission ratio while large radial forces are effective on the pivot shafts.

A torque transmitted through the transmission creates at the points of engagement of each power roller with the traction discs reaction forces which are both directed in the direction of the pivot shaft. Then axial forces on the pivot shaft are taken up by the axial piston 78 and the hydraulic fluid in each of the cylinder chambers 83 and 84 which are maintained at variably different pressures depending on the torque transmitted by the power rollers 25 and 26. The same pressure differential is maintained in the chambers 69 and 70 at opposite sides of the rotary piston 73 to help maintain the rollers in their desired position under balanced non-precessing conditions and to prevent spin in the contact area of the power rollers.

Though the device is shown and described only with one pair of opposite power rollers it can obviously be built with more than one pair of power rollers.

Furthermore, the pivot shafts could be interconnected mechanically or a servo valve arrangement could be provided for each of the pivot shafts, each servo valve being provided with the same position signal. Also, piloting movement of the valve lever 106 can be caused by mechanical or electrical means instead of the hydraulic means described and shown in the drawings.

What is claimed is:

1. In a rotary motion transmitting device comprising: a housing; coaxial input and output shafts rotatably supported in said housing; oppositely disposed toric elements, one being supported by each of said shafts for rotation therewith; at least two motion transmitting rollers disposed between said toric elements in radial symmetry with respect to the axis of the input and output shafts; a support structure for each of said rollers; and means for forcing said toric elements toward each other to cause frictional engagement of the motion transmitting rollers with the opposed surfaces of said toric elements; the combination therewith of tension means disposed between the toric elements and anchored to the housing, said tension means having radially outer ends spaced from said housing and connected to the roller support structures to balance the forces exerted on the rollers and to prevent transmission of vibrations from the rollers to the housing.

2. A rotary motion transmitting device as recited in claim 1, wherein said tension means are tension sheets, each comprising at least two leaves disposed side by side.

3. A rotary motion transmitting device as recited in claim 2, wherein each of said tension sheets consists of alternate layers of steel leaves and plastic sheets thereby forming a vibration dampening laminate sheet.

4. A rotary motion transmitting device as recited in claim 1, wherein each of said roller support structures comprises a pivot shaft having an axis normal to a plane through the axis of the input and output shafts, and pivoting means are provided for causing pivoting of said pivot shaft for changing the ratio of motion transmission between said toric elements.

5. A rotary motion transmitting device as recited in claim 4, wherein said pivoting means includes means for moving said pivot shaft axially out of its normal position.

6. A rotary motion transmitting device as recited in claim 5, wherein a rotary piston is mounted on the pivot shaft for rotation therewith and disposed in a rotary piston housing supported by a tension sheet.

7. A rotary motion transmitting device as recited in claim 4, wherein said pivoting means includes a hydraulically operable axial piston mounted on the pivot shaft and disposed in a cylinder supported by said housing with cylinder chambers disposed at opposite sides of said piston, and a hydraulically operable rotary piston is mounted on the pivot shaft and disposed in a housing supported by a tension sheet, each of said cylinder chambers being in communication with a predetermined one of the chambers at opposite sides of said rotary piston, and means are provided for selectively supplying pressurized fluid to said cylinder chambers.

8. A rotary motion transmitting device as recited in claim 7, wherein said means for supplying pressurized fluid to the cylinder chambers includes a servo valve, means for actuating said servo valve to cause pivotal movement of said pivot shaft and means associated with said pivot shaft for cancelling actuation of said servo valve upon completion of pivotal movement of the pivot shaft.

9. A rotary motion transmitting device as recited in claim 8, wherein a pivot arm is mounted on said pivot shaft and a valve lever is linked to said pivot arm and to said servo valve for operation thereof, said means for actuating said servo valve being a spring biased piston connected to said valve lever and adapted to be moved against the spring force by a fluid pressure signal.

10. In a rotary motion transmitting device comprising: coaxial input and output shafts; oppositely disposed toric elements, one being supported by each of said shafts for rotation therewith; at least two motion transmitting rollers disposed between said toric elements in radial symmetry with respect to the axis of the input and output shafts; a support structure for each of said rollers including an axially movable pivot shaft; means for forcing said toric elements toward each other to cause frictional engagement of the motion transmitting rollers with the opposed surfaces of the toric discs; the combination therewith of: a hydraulically operable axial piston connected to the pivot shaft and disposed in a cylinder with cylinder chambers at opposite sides of said piston; a hydraulically operable rotary piston mounted for rotation with the pivot shaft and disposed in a rotary piston housing; each of said cylinder chambers being in communication with a predetermined one of the chambers at opposite sides of said rotary piston; and means for selectively supplying pressurized fluid to said cylinder chambers.

11. A rotary motion transmitting device as recited in claim 10, wherein said means for supplying pressurized fluid to the cylinder chambers includes a servo valve, means for actuating said servo valve to cause pivotal movement of said pivot shaft and means associated with said pivot shaft for cancelling actuation of said servo valve upon completion of pivotal movement of the pivot shaft.

12. A rotary motion transmitting device as recited in claim 11, wherein a pivot arm is mounted on said pivot shaft and a valve lever is linked to said pivot arm and to said servo valve for operation thereof, said means for actuating said servo valve being a spring biased piston connected to said valve lever and adapted to be moved against the spring force by a fluid pressure signal.

13. A rotary motion transmitting device comprising: coaxial input and output shafts; oppositely disposed toric elements, one being supported by each of said shafts for rotation therewith; at least two motion transmitting rollers disposed between said toric elements in radial symmetry with respect to the axis of the input and output shafts; means for forcing said toric elements toward each other to cause frictional engagement of the motion transmitting rollers with the opposed surfaces of said toric elements; and a support structure for each of said rollers, each of said roller support structures including a pivot shaft having an axis normal to a plane through the axis of the input and output shafts, a bearing structure for pivotally supporting the pivot shaft and arranged to be movable in axial direction of, and together with, the pivot shaft; tension means extending between the toric elements and interconnecting the bearing structures to balance the forces exerted on the rollers, said tension means being movable with the bearing structures, and means for moving said pivot shafts and bearing structures axially out of their normal positions to cause pivoting of said pivot shaft for a change of the transmission ratio of the rotary motion transmitting device.

* * * * *